United States Patent
Yin et al.

(10) Patent No.: US 12,330,241 B1
(45) Date of Patent: Jun. 17, 2025

(54) ROBOT WELDING ASSEMBLY MECHANISM AND APPLICATION IN ANNULAR WELDING SEAM DETECTION AND POSTWELD HEAT TREATMENT

(71) Applicant: CHONGQING UNIVERSITY OF SCIENCE AND TECHNOLOGY, Chongqing (CN)

(72) Inventors: Limeng Yin, Chongqing (CN); Hehe Zhang, Chongqing (CN); Long Zhang, Chongqing (CN); Wei Feng, Chongqing (CN); Yuhua Chen, Chongqing (CN); Xuejun Wang, Chongqing (CN); Yuan Zhang, Chongqing (CN); Jing Wang, Chongqing (CN); Chengjie Zhang, Chongqing (CN)

(73) Assignee: CHONGQING UNIVERSITY OF SCIENCE AND TECHNOLOGY, Chongqing (CN)

( * ) Notice: Subject to any disclaimer, the term of this patent is extended or adjusted under 35 U.S.C. 154(b) by 0 days.

(21) Appl. No.: 18/969,225

(22) Filed: Dec. 4, 2024

(30) Foreign Application Priority Data

Mar. 30, 2024 (CN) .......................... 202410380645.6

(51) Int. Cl.
*B23K 31/02* (2006.01)
*B23K 31/12* (2006.01)
(Continued)

(52) U.S. Cl.
CPC .............. *B23K 31/02* (2013.01); *B23K 31/12* (2013.01); *B23K 37/0435* (2013.01); *B23K 2101/10* (2018.08)

(58) Field of Classification Search
CPC .......................................... B23K 37/04–0538
See application file for complete search history.

(56) References Cited

U.S. PATENT DOCUMENTS 3,239,209 A * 3/1966 Kucka ................... B23K 37/053
269/37
3,827,126 A * 8/1974 Shiozawa ................ B25H 1/00
29/721
(Continued)

FOREIGN PATENT DOCUMENTS

CN 103358135 A 10/2013
CN 203992976 U 12/2014
(Continued)

OTHER PUBLICATIONS

First Office Action in Chinese Application No. 202410380645.6 mailed on Jun. 29, 2024, 12 pages.
(Continued)

*Primary Examiner* — Kiley S Stoner
*Assistant Examiner* — Carlos J Gamino
(74) *Attorney, Agent, or Firm* — Porus IP LLC

(57) ABSTRACT

Disclosed is a robot welding assembly mechanism and an application in annular welding seam detection and postweld heat treatment. The robot welding assembly mechanism comprises a rotatable column. A plurality of transverse clamping portions are disposed at intervals on the column. A height-adjustable first V-shaped support portion is disposed at a periphery of the column. The first V-shaped support portion is mounted on a radial track. An annular track is disposed on an outer side of the radial track. A plurality of height-adjustable second V-shaped support portions are disposed on the annular track. The first V-shaped support portion and the second V-shaped support portions are capable of supporting a non-welded portion of the welded workpiece. A first driving mechanism of the rotation base, a second driving mechanism of the transverse clamping portions, and a third driving mechanism of each of the (Continued)

second V-shaped support portions are connected with a control system.

1 Claim, 5 Drawing Sheets

(51) Int. Cl.
*B23K 37/04* (2006.01)
*B23K 101/10* (2006.01)

(56) References Cited

U.S. PATENT DOCUMENTS

| | | | | |
|---|---|---|---|---|
| 3,844,468 | A | | 10/1974 | Nelson et al. |
| 5,040,716 | A | * | 8/1991 | Stetz .................... B23K 37/053 |
| | | | | 269/95 |
| 5,934,626 | A | * | 8/1999 | Collins, Jr. ........ B23K 37/0538 |
| | | | | 269/289 MR |
| 6,367,788 | B1 | * | 4/2002 | Babchuk .............. B23K 37/053 |
| | | | | 269/45 |
| 2009/0249602 | A1 | * | 10/2009 | Frehel ................ B23K 37/0443 |
| | | | | 29/281.5 |
| 2017/0314340 | A1 | * | 11/2017 | Hirvela .............. B23K 37/0538 |
| 2019/0193180 | A1 | * | 6/2019 | Troyer .................... B23K 9/295 |
| 2024/0424621 | A1 | * | 12/2024 | Bortoli .............. B29C 66/73921 |

FOREIGN PATENT DOCUMENTS

| | | | | |
|---|---|---|---|---|
| CN | 105345384 | A * | 2/2016 | ......... B23K 37/0533 |
| CN | 107081568 | A * | 8/2017 | ......... B23K 37/0533 |
| CN | 208358111 | U | 1/2019 | |
| CN | 109746624 | A | 5/2019 | |
| CN | 213614949 | U | 7/2021 | |
| CN | 114178646 | A | 3/2022 | |
| CN | 114700736 | A | 7/2022 | |
| CN | 116460523 | A * | 7/2023 | ........... B23K 37/053 |
| CN | 117066750 | A * | 11/2023 | ............. B08B 9/021 |
| CN | 220473404 | U | 2/2024 | |
| JP | 60061178 | A * | 4/1985 | ........... B23K 37/053 |
| KR | 102192444 | B1 | 12/2020 | |

OTHER PUBLICATIONS

Notification to Grant Patent Right for Invention in Chinese Application No. 202410380645.6 mailed on Jul. 5, 2024, 6 pages.

\* cited by examiner

ROBOT WELDING ASSEMBLY MECHANISM AND APPLICATION IN ANNULAR WELDING SEAM DETECTION AND POSTWELD HEAT TREATMENT

CROSS-REFERENCE TO RELATED APPLICATIONS

This application claims priority of Chinese Patent Application No. 202410380645.6, filed on Mar. 30, 2024, the entire contents of which are incorporated herein by reference.

TECHNICAL FIELD

The present disclosure relates to the technical field of robot welding, and in particularly to a robot welding assembly mechanism and an application in annular welding seam detection and postweld heat treatment.

BACKGROUND

The robot welding assembly mechanism generally refers to a mechanism or device used for assembling a welded workpiece and assisting robot in performing automatic welding. The main purpose/function of the robot welding assembly mechanism to fix the welded workpiece at a target position.

Existing pipeline assembly structures can realize semi-automatic mechanical assembly of pipelines. Pipelines to be welded can be fixed using positioners and clamps, and the pipelines to be welded can rotate, and can be linked with a pipe robot welding system. Although this assembly structure can reduce the assembly difficulty and improve the assembly accuracy, it is only effective for workpiece welding and is not suitable for welding seam detection and postweld heat treatment.

Therefore, it is desirable to provide a robot welding assembly mechanism which can effectively combine welding seam quality inspection and postweld heat treatment on the basis of performing workpiece welding.

SUMMARY

One or more embodiments of the present disclosure provide an application of a robot welding assembly mechanism in annular welding seam detection and postweld heat treatment. The robot welding assembly mechanism may include a rotatable column. The column may be mounted on a rotation base. A plurality of transverse clamping portions may be disposed at intervals on the column. The plurality of transverse clamping portions may be configured to clamp an end portion of a welded workpiece. A first V-shaped support portion may be disposed at a periphery of the column, the first V-shaped support portion being height-adjustable. The first V-shaped support portion may be mounted on a radial track. The first V-shaped support portion is capable of moving along the radial track to be fixed at an appropriate position. An extension line of the radial track may be perpendicular to and intersect with an axis of the column. The first V-shaped support portion may be located on an outer side of a center of gravity of the welded workpiece. An annular track may be disposed on an outer side of the radial track. The annular track may be coaxial with the column. A plurality of second V-shaped support portions may be disposed on the annular track, the plurality of second V-shaped support portions being height-adjustable. The plurality of second V-shaped support portions are capable of moving to a position to be fixed along the annular track. Both the first V-shaped support portion and the plurality of second V-shaped support portions are capable of supporting a non-welded portion of the welded workpiece to make an annular welding seam of the welded workpiece be suspended constantly. A first driving mechanism of the rotation base, a second driving mechanism of the plurality of transverse clamping portions, and a third driving mechanism of each of the plurality of second V-shaped support portions may be connected with a control system.

A movable operating platform may be provided in the vicinity of the annular welding seam of the welded workpiece. The operating platform may be configured to place a welding seam detection device and a heat treatment device. The robot welding assembly mechanism may be configured to perform an annular welding seam detection process and/or a postweld heat treatment process. The annular welding seam of the welded workpiece may include one or more pipe sections, first butt welding seams between the one or more pipe sections, and second butt welding seams between the one or more pipe sections and one or more pipe fittings. A nominal diameter of the annular welding seam may not be less than DN150 mm. The robot welding assembly mechanism may be configured to perform the annular welding seam detection process, including the following operations:

A. placing the welding seam detection device on the operating platform during a detection time period of the annular welding seam B. controlling the first driving mechanism of the rotation base and the third driving mechanism of each of the plurality of second V-shaped support portions to operate to make the column and the plurality of second V-shaped support portions synchronously rotate in place and then stop, at the same time, the annular welding seam of the welded workpiece being located right above or to a side of the welding seam detection device;

C. patching or calibrating a detection portion on the annular welding seam;

D. turning on the welding seam detection device to carry out detection on a first detection region of the annular welding seam; after the detection of the first detection region is completed, turning off the welding seam detection device and controlling the second driving mechanism of the plurality of transverse clamping portions to operate to make the annular welding seam rotate by a preset angle, and then turning on the welding seam detection device to carry out detection on a second detection region of the annular welding seam until detection of all detection regions of the annular welding seam is completed;

E. referring to the operations B-D, carrying out detection on an annular welding seam of a next welded workpiece;

the robot welding assembly mechanism may be configured to perform the heat treatment process of the annular welding seam, including the following operations:

O. before the heat treatment of the annular welding seam, placing the heat treatment device on the operating platform;

P. controlling the first driving mechanism of the rotation base and the third driving mechanism of each of the plurality of second V-shaped support portions to operate to make the column and the plurality of second V-shaped support portions synchronously rotate in place and then stop, the annular welding seam of the welded workpiece being located in the vicinity of the heat treatment device;

Q. coating one or more adjacent annular welding seams with a heat treatment electrode and a heat insulation material;

R. turning on the heat treatment device to perform heat treatment on the one or more adjacent annular welding seams;

S. referring to the operations P-R, performing heat treatment on the annular welding seams of other welded workpieces.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering indicates the same structure, wherein.

DETAILED DESCRIPTION

Figure 1:
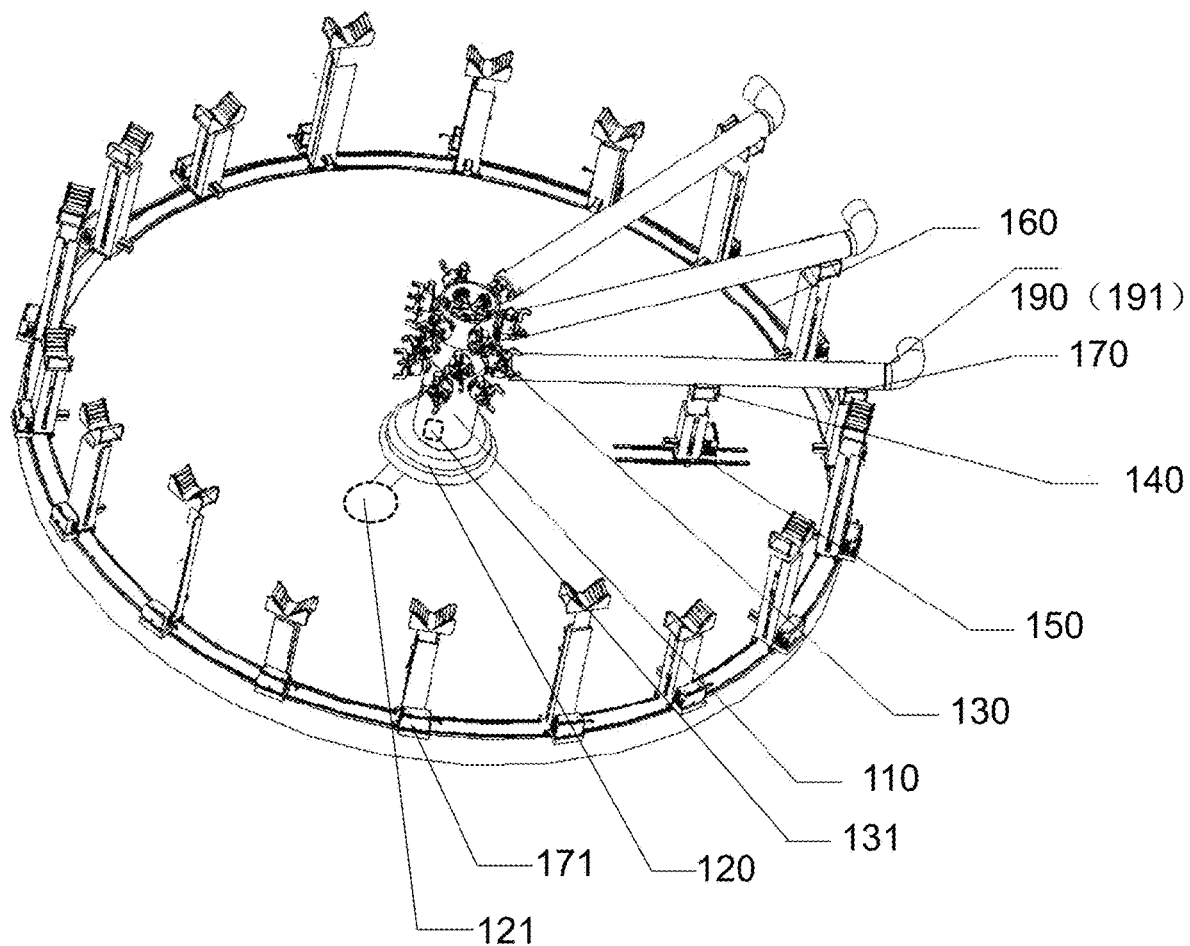
FIG. 1 is a stereoscopic schematic diagram illustrating a robot welding assembly mechanism according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

It should be understood that the terms "system", "device", "unit" and/or "module" used herein are a way to distinguish between different components, elements, parts, sections, or assemblies at different levels. However, the terms may be replaced by other expressions if other words accomplish the same purpose.

As shown in the present disclosure and in the claims, unless the context clearly suggests an exception, the words "one", "a", "an", "one kind", and/or "the" do not refer specifically to the singular, but may also include the plural. Generally, the terms "including" and "comprising" suggest only the inclusion of clearly identified steps and elements, however, the steps and elements that do not constitute an exclusive list, and the method or apparatus may also include other steps or elements.

Figure 2:
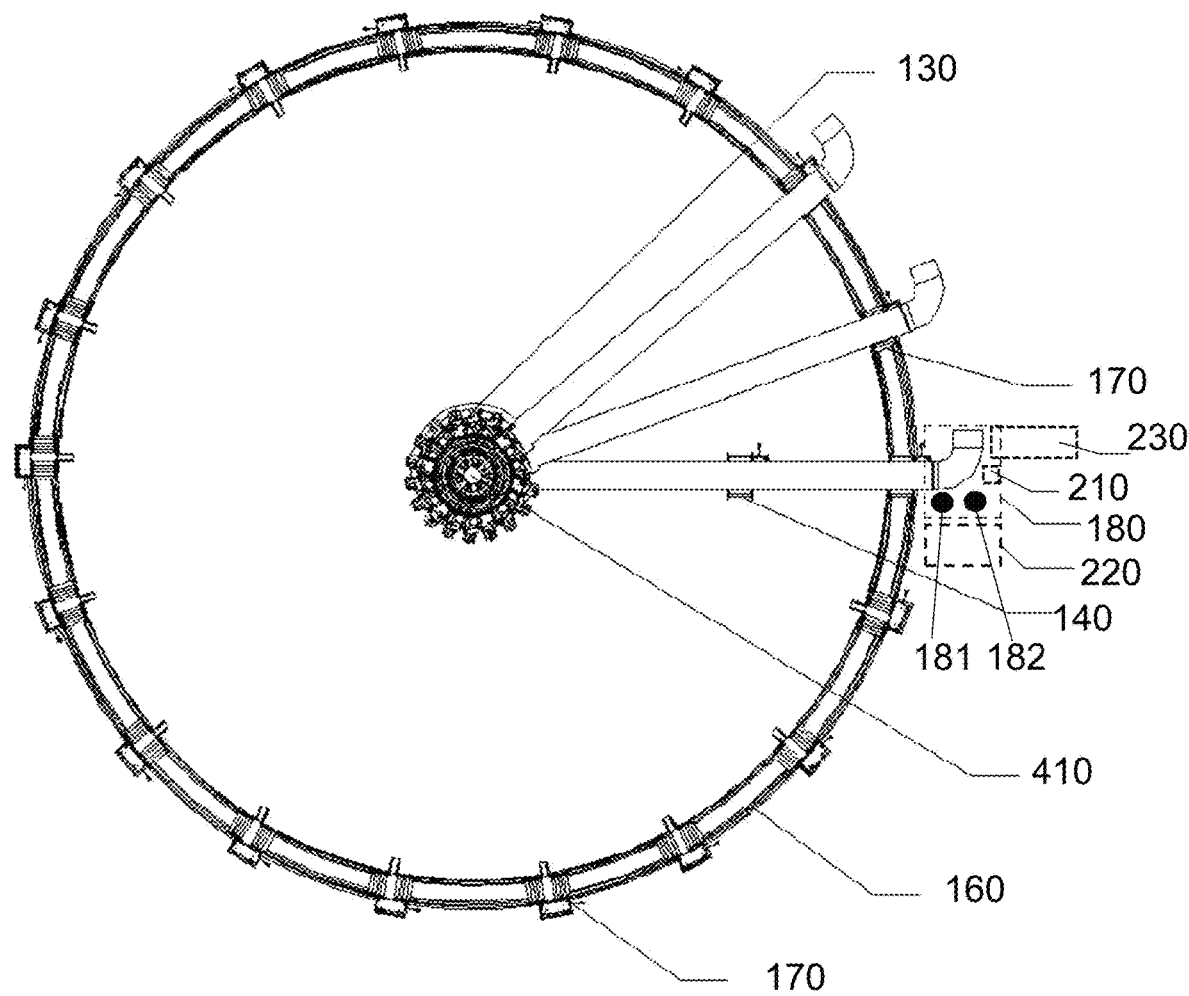
FIG. 2 is a schematic diagram illustrating a top view of a robot welding assembly mechanism according to some embodiments of the present disclosure.

FIG. 1 is a stereoscopic schematic diagram illustrating a robot welding assembly mechanism according to some embodiments of the present disclosure. FIG. 2 is a schematic diagram illustrating a top view of a robot welding assembly mechanism according to some embodiments of the present disclosure.

In some embodiments, as shown in FIG. 1 and FIG. 2, a robot welding assembly mechanism 100 may include a column 110, a rotation base 120, a plurality of transverse clamping portions 130, a first V-shaped support portion 140, a radial track 150, an annular track 160, a plurality of second V-shaped support portions 170, and an operating platform 180, a welded seam detection device 181, and a heat treatment device 182.

The column 110 is a central columnar structure of the robot welding assembly mechanism 100.

In some embodiments, the column 110 may be configured to support and move other components. For example, the plurality of transverse clamping portions 130 may be disposed at intervals on the column 110. In some embodiments, the column 110 is capable of rotating around an axis of the column 110.

In some embodiments, the column 110 may be mounted on the rotation base 120.

The rotation base 120 may be configured support and rotate a device or instrument mounted thereon. For example, the rotation base 120 may be configured to support the column 110 and allow the column 110 to rotate.

The plurality of transverse clamping portions 130 may be configured to clamp an end portion of a welded workpiece 190. In some embodiments, each of the transverse clamping portions 130 may be made of a material such as steel, an aluminum alloy, stainless steel, or the like. The form of each of the transverse clamping portions 130 may include a jaw type, V-block, a magnetic clamp, etc.

In some embodiments, the plurality of transverse clamping portions 130 may be disposed at intervals on the column 110, and the transverse clamping portions 130 at the same height may be evenly distributed around the column 110.

The first V-shaped support portion 140 refers to a portion configured to support a V-shaped non-welded portion of the welded workpiece 190. In some embodiments, a height of the first V-shaped support portion 140 is adjustable to meet the height requirements of the welded workpieces 190 of different sizes.

In some embodiments, the first V-shaped support portion 140 may be disposed at a periphery of the column 110 and mounted on the radial track 150.

The radial track 150 may be configured to guide and support a part moving along a radial direction. For example, the radial track 150 may be configured to guide the first V-shaped support portion 140 to move.

In some embodiments, as shown in FIG. 1, an extension line of the radial track 150 may be perpendicular to and intersect with the axis of the column 110, and the first V-shaped support portion 140 may move along the radial track 150 to be fixed at an appropriate position. In some embodiments, the first V-shaped support portion 140 may be located on an outer side of a center of gravity of the welded workpiece 190. the outer side of the center of gravity of the welded workpiece 190 refers to a side away from the column 110 with respect to the column 110.

The annular track 160 may be configured to guide and support a part moving along a circular path. For example, the annular track 160 may be configured to mount and move the second V-shaped support portions 170 to support the other side of the welded workpiece 190. In some embodiments, the annular track 160 may be disposed on an outer side of the radial track 150 and coaxial with the column 110.

In some embodiments, the plurality of second V-shaped support portions 170 with adjustable heights may be disposed on the annular track 160, and the plurality of second V-shaped support portions 170 may be fixed after moving along the annular track 160 in place. Both the first V-shaped support portion 140 and the plurality of second V-shaped support portions 170 may support the non-welded portion of the welded workpiece 190 to make an annular welding seam 191 of the welded workpiece 190 be suspended constantly. For example, a count of the second V-shaped support portions 170 may be 10, 16, 18, 20, etc.

In some embodiments, the rotation base 120 may include a first driving mechanism 121, such as a motor. The transverse clamping portions 130 may include a second driving mechanism 131, such as a motor. Each of the plurality of second V-shaped support portions 170 may include a third driving mechanism 171, such as a motor. In some embodiments, the first driving mechanism 121 of the rotation base 120, the second driving mechanism 131 of the transverse clamping portions 130, and the third driving mechanism 171 of each of the plurality of second V-shaped support portions 170 may be connected with a control system 520 (see FIG. 5).

The operating platform 180 is a structure for supporting and providing a workspace.

In some embodiments, the operating platform 180 may be provided in the vicinity of the annular welding seam 191 of the welded workpiece 190 and configured to place a welded seam detection device 181 and a heat treatment device 182 to perform welding seam detection and heat treatment operation.

In some embodiments, the welded workpiece 190 may include one or more pipe sections connected together by welding, where a welding point may be the annular welding seams 191. The annular welding seam 191 may include the one or more pipe sections, first butt welding seams between the one or more pipe sections, and second butt welding seams between the one or more pipe sections and one or more pipe fittings. A nominal diameter of the annular welding seam may not be less than DN150 mm.

As shown in FIG. 1 and FIG. 2, taking the welded workpiece 190 as a workpiece connected by welding a straight pipe section and an elbow as an example, the welded workpiece 190 is alloy steel with a nominal diameter of 350 millimeters, a wall thickness of 18 millimeters, and a length of the straight pipe section of 12 meters (DN350*18 mm*12 m).

Each of the transverse clamping portions 130 may clamp an end of the straight pipe section of the welded workpiece 190 that is away from the elbow. Each of the second V-shaped support portions 170 may support the straight pipe section (near the annular welding seam side) of the welded workpiece 190. The first V-shaped support portion 140 may only support the welded workpiece during the welding process and reset after welding is completed. The annular welding seam and the elbow of the welded workpiece 190 may remain suspended constantly.

In some embodiments, the robot welding assembly mechanism 100 may be configured to perform an annular welding seam detection process and/or a postweld heat treatment process.

The annular welding seam detection process refers to quality inspection of a girth weld of the welded workpiece.

For example, the annular welding seam detection may include radiographic testing (RT) and ultrasonic testing (UT), etc.

The postweld heat treatment process refers to a process of heating and controlled cooling of a welding seam and a surrounding region after welding is completed. For example, the postweld heat treatment process may include welding seam heat treatment, a heat treatment electrode, heat insulation material coating, etc.

In some embodiments, the robot welding assembly mechanism 100 may perform the annular welding seam detection process. That is, the robot welding assembly mechanism 100 may conduct detection on the annular welding seams 191 of the plurality of welded workpieces 190 on the robot welding assembly mechanism 100, including the following operations.

A. A welding seam detection device may be placed on the operating platform 180 during a detection time period of the annular welding seam.

In some embodiments, RT is usually conducted at night. The welding seam detection device may be placed on the operating platform 180 to ensure that during a formal detection period, the welding seam detection device can be immediately put into use.

B. The first driving mechanism 121 of the rotation base 120 and the third driving mechanism 171 of each of the plurality of second V-shaped support portions may be controlled to operate to make the column 110 and the plurality of second V-shaped support portions 170 synchronously rotate in place and then stop, at the same time, the annular welding seam 191 of the welded workpiece 190 may be located right above or to a side of the welding seam detection device C. Patches may be attached to detection portions or the detection portions on the annular welding seam 191 may be marked.

The patches refer to welding seam developing films that need to be placed during detection. A count of patches may be a preset number.

Taking an annular welding seam with a diameter of 350 mm and a wall thickness of 18 mm (DN350*18 mm) as an example, the count of patches is 8.

In some embodiments, for RT, the patches need to be attached while marking each detection region with a detection mark, each patch corresponding to one detection region; for UT, an ultrasonic probe directly detects the welding seam without patches, only the detection portions need to be marked to facilitate accurate positioning of the ultrasonic probe for detection.

D. The welding seam detection device may be turned on to carry out detection on a first detection region of the annular welding seam 191; after the detection of the first detection region is completed, the welding seam detection device may be turned off and the second driving mechanism 131 of each of the plurality of transverse clamping portions 130 may be controlled to operate to make the annular welding seam 191 rotate by a preset angle, and then the welding seam detection device may be turned on to carry out detection on a second detection region of the annular welding seam 191 until detection of all detection regions of the annular welding seam 191 is completed;

Taking a preset angle of 45° as an example, after detection of the first detection region is completed, first the welding seam detection device may be turned off, and the second driving mechanism 131 of each of the transverse clamping portions 130 may be controlled to operate to make the annular welding seam 191 rotate by 45°. By analogy, after detection of all detection portions is completed, detection of one annular welding seam is completed.

E. Referring to the operations B-D, detection may be performed on an annular welding seam 191 of a next welded workpiece 190.

In some embodiments of the present disclosure, in the operation of detecting the annular welding seam of the plurality of workpieces on the robot welding assembly mechanism, the detection speed of each annular welding seam is high (requiring only about 35 min), and the detection can be efficiently and conveniently completed by a single technician. The entire process of welding seam detection is more efficient, which reduces time and personnel configuration requirements for detection, and greatly reduces the operation difficulty and the workload of the detection personnel for the welding seam.

In some embodiments, the robot welding assembly mechanism 100 may perform the annular welding seam heat treatment process. That is, the robot welding assembly mechanism 100 may perform heat treatment on the annular welding seams 191 of the plurality of welded workpieces 190 on the robot welding assembly mechanism 100, including the following operations.

O. Before the heat treatment of the annular welding seam 191, the heat treatment device may be placed on the operating platform 180.

P. The first driving mechanism 121 of the rotation base 120 and the third driving mechanism 171 of each of the plurality of second V-shaped support portions 170 may be controlled to operate to make the column 110 and the plurality of second V-shaped support portions 170 synchronously rotate in place and then stop, at this time, the annular welding seams 191 of the welded workpiece may be located in the vicinity of the heat treatment device.

For example, by operating the first driving mechanism 121 of the rotation base 120 and the third driving mechanism 171 of each of the second V-shaped support portions 170, the column 110 and the second V-shaped support portions 170 may rotate synchronously according to a preset angle until the annular welding seams 191 of the plurality of welded workpieces 190 are located in the vicinity of an operation region of the heat treatment device, and then stop rotating, which ensures that the heat treatment device can process the plurality of annular welding seams 191 simultaneously, thereby reducing repeated positioning and movement operation of the device.

Q. One or more adjacent annular welding seams 191 may be coated with a heat treatment electrode and a heat insulation material.

R. The heat treatment device may be turned on to perform heat treatment on the one or more adjacent annular welding seams 191. After the heat treatment is completed, the heat treatment electrode and the heat insulation material may be removed.

S. Referring to the operations P-R, heat treatment may be performed on the annular welding seams of other welded workpieces.

In some embodiments of the present disclosure, with the heat treatment operation for the annular welding seams of the plurality of workpieces on the robot welding assembly mechanism, preparations such as workpiece pose adjustment, heat treatment electrode, and heat insulation material coating are significantly simplified, such that the processing speed is high (the preparation for each annular welding seam takes only about 5 min), and the preparations for heat treatment can be rapidly and conveniently completed by a single technician, which greatly reduces the labor intensity and work difficulty for the technician, reduces the manpower requirements, and improves the overall efficiency of the heat treatment of the welding seam.

In some embodiments of the present disclosure, by applying the robot welding assembly mechanism to the processes of annular welding seam detection and postweld heat treatment, the continuous connection of the two processes is ingeniously realized, which makes detection and heat treatment be sequentially completed after the batch of workpieces is welded, thereby effectively enhancing the operation efficiency and reducing the process complexity. Meanwhile, the inconvenience of connection caused by equipment scheduling and operation method limitations in conventional modes is overcome, which greatly reduces the operation difficulty. Even for heavy workpieces, the processes of detection and heat treatment can be smoothly completed by a single technician, so as to significantly reduce the operation complexity and dependence on equipment, and enhances the convenience and efficiency of the processes.

In some embodiments, as shown in FIG. 2, the robot welding assembly mechanism 100 may further include an image acquisition device 210. The image acquisition device 210 may be located above the operating platform 180 and configured to acquire a welded workpiece image.

The image acquisition device 210 refers to an image device that collects image information of the welded workpiece 190. For example, the image acquisition device 210 may be a camera, a photographic apparatus, or other imaging devices.

The welded workpiece image refers to the image information of the welded workpiece 190. The welded workpiece image is capable of reflecting the shape of the welded workpiece, the shape of the welding seam, the position of the welding seam, etc.

Figure 5:
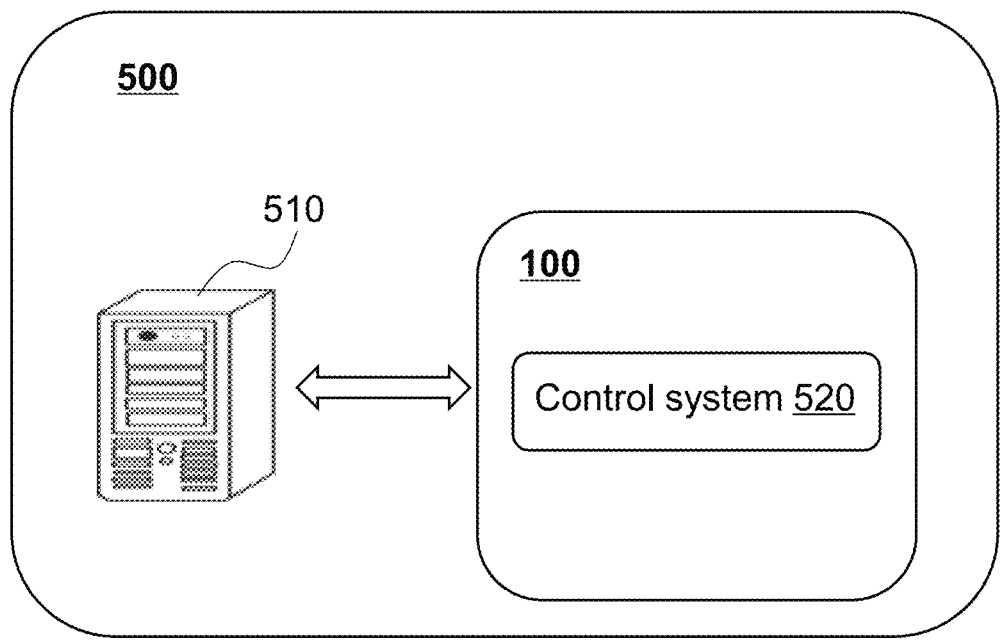
FIG. 5 is a block diagram illustrating an exemplary robot welding assembly system according to some embodiments of the present disclosure.

In some embodiments, the image acquisition device 210 may be in communication connection with a remote processor 510 (see FIG. 5). The remote processor 510 may activate the image acquisition device 210 to capture the welded workpiece image in a current state.

The remote processor 510 may be configured to manage data resources and process data and/or information from the robot welding assembly mechanism 100. For example, the remote processor 510 may interact with the control system 520 of the robot welding assembly mechanism 100 and process data and/or information from the control system 520. The remote processor may execute program instructions based on the data, information, and/or processing results to implement one or more functions described in the present disclosure. In some embodiments, the remote processor may be a single server or a server group. The server group may be centralized or distributed. In some embodiments, the remote processor may be local or remote. In some embodiments, the remote processor may be implemented on a cloud platform. Merely by way of example, the cloud platform may include a private cloud, public cloud, hybrid cloud, or any combination thereof.

In some embodiments of the present disclosure, the image acquisition device may be located above the operating platform, allowing for an overhead perspective, such that image acquisition device can cover the entire contour of the welded workpiece, thereby enhancing the image quality and the analysis accuracy.

In some embodiments, the operating platform 180 may include a movable part 220. The operating platform 180 may move along a radial direction and/or a circumferential direction of the robot welding assembly mechanism 100 through the movable part 220.

The movable part is a mechanical or structural part that helps the operating platform 180 move. For example, the movable part may include pulleys disposed at a bottom of the operating platform 180, or other movable parts.

As shown in FIG. 2, the radial direction refers to a diameter direction along the annular track 160.

As shown in FIG. 2, the circumferential direction refers to a circumferential direction along the annular track 160.

In some embodiments, as shown in FIG. 2, the welded workpiece 190 consists of a straight pipe portion and an elbow portion, a length of the straight pipe portion being greater than a diameter of the annular track 160. When the operating platform 180 moves along the radial direction and/or the circumferential direction of the robot welding assembly mechanism 100 through the movable part, a movement range may be limited to an outer region of the annular track 160.

In some embodiments of the present disclosure, the operating platform may move along the radial direction and/or the circumferential direction of the robot welding assembly mechanism through the movable part, such that the operating platform can efficiently carry out operation, thereby enhancing the flexibility of the operating platform. By restricting the movement range of the operating platform to the outer region of the annular track 160, collision between the operating platform and the column or the welded workpiece can be prevented, thereby avoiding problems of physical interference or insufficient space during operation.

In some embodiments, the remote processor 510 may be configured to: obtain a height of the first V-shaped support portion 140 (hereinafter referred to as "height") and a cross-sectional diameter of the welded workpiece 190; obtain the welded workpiece image from the image acquisition device 210; determine an edge distance based on the welded workpiece image; and determine a movement distance of the operating platform 180 based on the edge distance, the height, the cross-sectional diameter, and a current position of the operating platform 180.

In some embodiments, the height and the cross-sectional diameter may be obtained based on user input data.

The edge distance refers to a distance from the welding seam to the annular track 160.

In some embodiments, the remote processor 510 may determine the edge distance in various ways. For example, before the annular welding seam detection process or the postweld heat treatment process, the remote processor 510 may activate the image acquisition device to capture a series of standard images, and annotate the edge distance for each standard image and store the edge distance. During subsequent actual operations, the image acquisition device 210 may capture an image of a current welded workpiece in real time and transmit the image to the remote processor 510. The remote processor 510 may determine a similarity between the image of the current welded workpiece and the standard images, and use an edge distance corresponding to a standard image with the highest similarity as the edge distance of the current welded workpiece.

The similarity may be expressed by a pixel similarity, or the like.

In some embodiments, the remote processor 510 may also determine the edge distance based on the height, the cross-sectional diameter, and the welded workpiece image through a determination model. The determination model may be a machine learning model.

The determination model refers to a model for determining the edge distance. In some embodiments, the determination model may be the machine learning model, such as a convolutional neural network (CNN) model.

Figure 3:
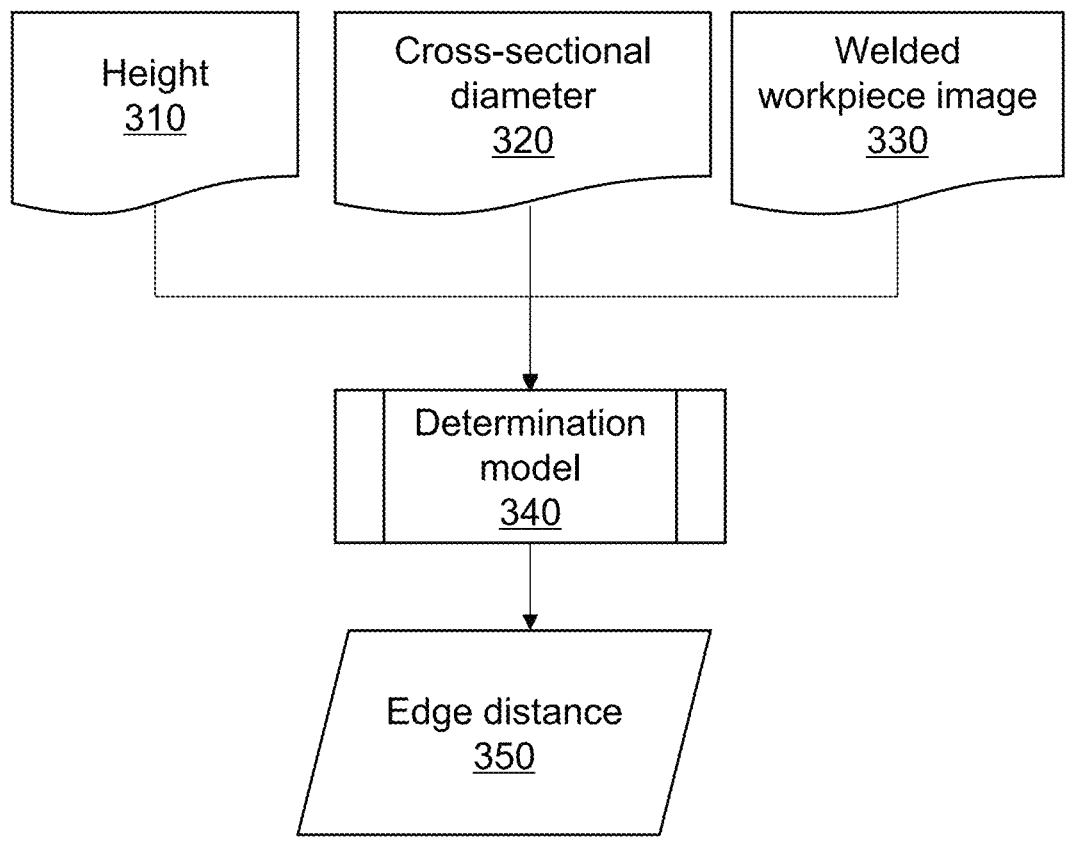
FIG. 3 is a schematic diagram illustrating an exemplary determination model according to some embodiments of the present disclosure.

FIG. 3 is a schematic diagram illustrating an exemplary determination model according to some embodiments of the present disclosure.

In some embodiments, as shown in FIG. 3, an input of a determination model 340 may include a height 310, a cross-sectional diameter 320, and a welded workpiece image 330, and an output of the determination model 340 may include an edge distance 350.

In some embodiments, the remote processor 510 may train the determination model using a large number of first training samples with first labels through methods such as gradient descent. The first training samples may include a sample height, a sample cross-sectional diameter, and a sample first welded workpiece image. The first labels of the first training samples may include an edge distance actually measured by a distance measurement instrument under the condition of the first training samples.

In some embodiments, the remote processor 510 may obtain the first training samples based on historical data.

In some embodiments, the remote processor 510 may input a plurality of first training samples with the first labels into an initial determination model, construct a loss function based on the first labels and output results of the initial determination model, and iteratively update parameters of the initial determination model through gradient descent or other methods based on the loss function. When a preset condition is met, the model training may be completed, and a trained determination model may be obtained. The preset conditions may include that the loss function converges, a count of iterations reaches a threshold, or the like.

In some embodiments of the present disclosure, by using the trained determination model, patterns can be found from a large amount of data using the self-learning capability of the machine learning model, thereby improving the accuracy and efficiency of the edge distance.

The current position of the operating platform 180 refers to a current physical location of the operating platform 180 during the processes of annular welding seam detection and postweld heat treatment.

In some embodiments, the remote processor 510 may determine the movement distance in various ways. For example, the remote processor may determine the movement distance by querying a first preset table based on the edge distance, the height, the cross-sectional diameter, and the current position. The first preset table may include a correspondence between the edge distance, the height, the cross-sectional diameter, the current position, and the movement distance.

In some embodiments, the first preset table may be obtained through experiments. Detection may be performed by conducting simulation experiments based on the height, the cross-sectional diameter, the edge distance, and the current position, and a movement distance corresponding to data with the highest data integrity may be recorded in the first preset table.

In some embodiments, the data integrity may be obtained by calculating a ratio between the actually detected data and theoretical data. The theoretical data may be constructed by a technician based on prior knowledge.

For example, if four data items A, B, C, and D need to be detected, and the actual detected data only includes B, C, and D, and C is not within the theoretical data range, the data integrity is 2/4=50%.

In some embodiments, the remote processor 510 may determine a detection reliability value based on the edge distance, the height, the cross-sectional diameter, and a candidate position of the operating platform 180; and determine the movement distance based on the detection reliability value, the candidate position, and current position.

The candidate position refers to a preset position of the operating platform. In some embodiments, the candidate position may be set by the remote processor 510 and/or preset by a technician according to requirements.

In some embodiments, one or more candidate positions of the operating platform may be provided.

The detection reliability value refers to a numerical value used to measure the reliability and accuracy of a detection result. The larger the detection reliability value, the more reliable the detection result.

In some embodiments, the remote processor may determine the detection reliability value in various ways. For example, the remote processor 510 may construct a vector to be matched based on the edge distance, the height, the cross-sectional diameter, and the candidate position; calculate a vector similarity between the vector to be matched and standard vectors; and determine a label corresponding to a vector with the highest similarity as the detection reliability value. The similarity may be expressed by a cosine similarity, a vector distance, or the like.

In some embodiments, the standard vectors may be obtained through sample data. The sample data may be obtained from historical data. The most complete data detected in the historical data may be used as the sample data. In some embodiments, the remote processor 510 may calculate a similarity between the sample data and data obtained by various other detection methods, and take an average similarity as a standard detection reliability value. Other detection methods may include ultrasonic testing, radiographic testing, magnetic particle testing, penetrant testing, or the like.

In some embodiments, the remote processor 510 may construct a clustering vector based on the edge distance, the height, the cross-sectional diameter, a detection position, and the standard detection reliability value in the sample data; process the clustering vector based on a clustering algorithm to determine a preset count of clustering centers, and construct standard vectors from the edge distance, the height, the cross-sectional diameter, and the detection position corresponding to the clustering centers, and use the standard detection reliability value as a label of the standard vectors. The clustering algorithm may include but is not limited to K-Means clustering and/or density-based spatial clustering of applications with noise (DBSCAN), or the like. The detection position is a position where the welding seam detection device performs detection.

Since the detection is affected by the position of the operating platform, determining the detection reliability can effectively ensure the effect and quality of welding seam detection or heat treatment.

In some embodiments, the remote processor 510 may determine the detection reliability value based on the edge distance, the height, the cross-sectional diameter, and the candidate position through a reliability value model. The reliability value model may be a machine learning model.

The reliability value model refers to a model used to predict and determine the detection reliability value. In some embodiments, the reliability value model may be the machine learning model, such as a deep neural network (DNN) model, or the like.

In some embodiments, an input of the reliability value model may include the height, the cross-sectional diameter, and the candidate position, and an output of the reliability value model may include the detection reliability value.

The reliability value model may be trained using a plurality of second training samples with second labels. The second training samples may include a sample edge distance, a sample height, a sample cross-sectional diameter, and a sample candidate position. The second labels may include the detection reliability value corresponding to the sample data. The detection reliability value may be obtained in a similar way to the foregoing, i.e., by comparing the sample data with data from various detection methods and calculating the similarity, and using the average similarity as the detection reliability value.

In some embodiments, the remote processor 510 may use the most complete data detected in the historical data as the sample data. The first training samples may be obtained based on the sample data. The training process of the reliability value model may be similar to that of the determination model. More descriptions regarding the training process of the reliability value model may be found in the training process of the determination model described above.

In some embodiments of the present disclosure, by using the trained reliability value model, the calculation process of the detection reliability value can be optimized, and the reliability of the detection result can be quickly and accurately evaluated, thereby making the detection reliability value more reliable.

In some embodiments, the remote processor 510 may determine a detection reliability value corresponding to each candidate position based on a plurality of candidate positions, select a candidate position corresponding to the highest detection reliability value, and calculate difference data between the candidate position and the current position as the movement distance of the operating platform. The difference data may include distance values in X, Y, and Z coordinate directions.

In some embodiments of the present disclosure, the detection result may be affected by different positions of the operating platform. For example, if the operating platform is too far or the angle is not good, the detection result may be incomplete. By introducing the plurality of candidate positions of the operating platform and comparing the detection reliability values of the plurality of candidate positions of the operating platform, the detection result is ensured to be more accurate and complete, thereby further ensuring the effect and quality of welding seam flaw detection or heat treatment.

In some embodiments of the present disclosure, by determining the edge distance, accurate spatial positioning of the welded workpiece can be formed, and the optimal detection position can be obtained, thereby ensuring that the part to be detected is at the center of the detection device, and avoiding dead corners or blind spots during detection; by comprehensively considering the height of each first V-shaped support portion at the current position of the operating platform, the cross-sectional diameter of the welded workpiece, and the edge distance, the movement distance of the operating platform can be accurately calculated, such that the operating platform can accurately move to the optimal detection position.

In some embodiments, the remote processor 510 may determine a rotation angle of the annular welding seam 191 based on the cross-sectional diameter and height, and control the second driving mechanism 131 of each of the transverse clamping portions 130 to operate to make the welded workpiece 190 rotate.

The rotation angle refers to an angle by which the transverse clamping portions 130 make the annular welding seam rotate during the process of annular welding seam detection.

In some embodiments, the remote processor 510 may determine the rotation angle in various ways. For example, the remote processor 510 may construct a vector to be matched based on the cross-sectional diameter and the height; calculate vector similarity between the vector to be matched and standard vectors; and determine a label corresponding to a vector with the highest similarity as the rotation angle of the annular welding seam. The similarity may be expressed by a cosine similarity, a vector distance, or the like.

In some embodiments, the remote processor 510 may construct a clustering vector based on the cross-sectional diameter, the height, and the rotation angle of the annular welding seam corresponding to the sample data in the sample data; process the clustering vector using a clustering algorithm to determine a preset count of clustering centers; and construct standard vectors from cross-sectional diameters and heights corresponding to the clustering centers, and use the rotation angles corresponding to the sample data as the labels of the standard vectors.

In some embodiments, the remote processor 510 may determine the rotation angle based on the cross-sectional diameter and the height through an angle determination model. The angle determination model may be a machine learning model.

The angle determination model refers to a model for predicting and determining the rotation angle. In some embodiments, the angle determination model may be the machine learning model, such as a deep neural network (DNN) model, or the like.

Figure 4:
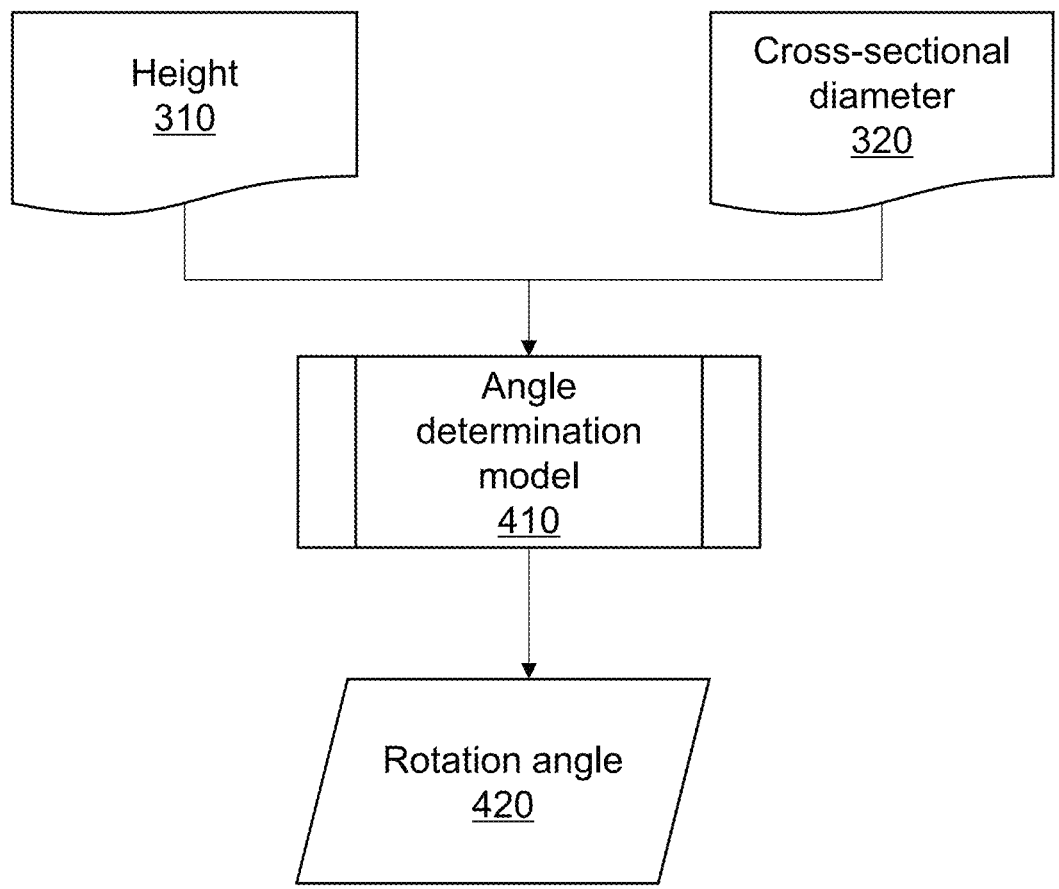
FIG. 4 is a schematic diagram illustrating an exemplary angle determination model according to some embodiments of the present disclosure.

FIG. 4 is a schematic diagram illustrating an exemplary angle determination model according to some embodiments of the present disclosure.

In some embodiments, as shown in FIG. 4, an input the angle determination model 410 may include the height 310 and the cross-sectional diameter 320, and an output of the angle determination model 410 may include a rotation angle 420.

The angle determination model may be trained using a plurality of third training samples with third labels. The third training samples may include a sample height and a sample cross-sectional diameter, and the labels may include the rotation angle of the annular welding seam corresponding to the sample data.

In some embodiments, the remote processor may determine the third training samples based on the height and the cross-sectional diameter in the sample data. The training process of the angle determination model may be similar to that of the reliability value model. More descriptions regarding the training process of the angle determination model may be found in the training process of the reliability value model described above.

In some embodiments of the present disclosure, by introducing the angle determination model, patterns can be found from a large amount of data using the self-learning capability of the machine learning model, thereby improving the determination accuracy and efficiency of the rotation angle.

In some embodiments of the present disclosure, with the vector matching method, historical data with the highest similarity can be found from a large number of historical data to find the most appropriate rotation angle, such that the detection device can completely cover the welding seam, thereby ensuring that the detection result of the welded workpiece is more accurate.

In some embodiments, in response to determining that the rotation angle does not meet a preset condition, the remote processor 510 may determine a movement distance.

The preset condition refers to a condition used to determine the rotation angle of the annular welding seam. In some embodiments, not meeting the preset condition may include the absence of the rotation angle of the annular welding seam, or the rotation angle of the annular welding seam being greater than a preset angle value. The remote processor 510 may determine, based on a relationship curve between data with the highest integrity in historical data and the rotation angle of the annular welding seam, a rotation angle of the annular welding seam corresponding to a position with the maximum slope of the curve as the preset angle value.

In some embodiments, in response to determining that the rotation angle does not meet the preset condition, the operating platform may perform circumferential movement based on a circumferential rotation parameter. More descriptions may be found in the present disclosure below.

In some embodiments of the present disclosure, when the rotation angle does not meet the preset condition, some portions of the welding seam may be in a blind spot of the detection device and the heat treatment device. By determining and adjusting the movement distance of the operating platform, the detection device and the heat treatment device may be adjusted to an optimal position, ensuring that every portion of the welded workpiece can be uniformly and fully detected and processed.

In some embodiments, the robot welding assembly mechanism 100 may further include a mechanical arm 230. The mechanical arm 230 may be located on the operating platform 180 and configured to attach patches to or mark detection portions on the annular welding seam 191, and/or coat one or more adjacent annular welding seams 191 with a heat treatment electrode and a heat insulation material.

The mechanical arm 230 refers to an operating device integrated into the robot welding assembly mechanism 100. In some embodiments, one or more mechanical arms may be provided, and disposed on one or more operating platforms.

In some embodiments of the present disclosure, with the plurality of mechanical arms attaching the patches to or marking the detection portions on the annular welding seam, and coating the one or more adjacent annular welding seams with the heat treatment electrode and the heat insulation material, the heat treatment electrode and the heat insulation material can be uniformly covered on the adjacent welding seams, such that the heat treatment device can heat the welding seam uniformly, manual involvement in the entire process is reduced, and the process is more efficient.

In some embodiments, the robot welding assembly mechanism 100 may include a plurality of operating platforms 180. The welding seam detection device or the heat treatment device may be alternately placed on the plurality of operating platforms 180.

In some embodiments, the plurality of operating platforms may be arranged along an outer region of the annular track 440. The detection device and the heat treatment device may be alternately arranged on the plurality of operating platforms 180.

In some embodiments, when the robot welding assembly mechanism 100 rotates around the welded workpiece 190, the mechanical arm 230 may perform a corresponding task according to a type of the device (detection or heat treatment) on the operating platform 180.

For example, the welding seam detection device may be arranged on a certain operating platform, and the heat treatment device may be arranged on an adjacent operating platform, and so on. When the welding seam detection device on the certain operating platform completes detection of a certain region, the adjacent operating platform may move to the region, and the heat treatment device on the operating platform may start heat treatment through the mechanical arm.

In some embodiments, the remote processor 510 may determine the circumferential rotation parameter based on a first parameter of the welding seam detection device and a second parameter of the heat treatment device; and control the plurality of operating platforms 180 with the alternately placed welding seam detection device or heat treatment device to perform the circumferential movement based on the circumferential rotation parameter.

The first parameter of the welding seam detection device is a parameter related to the welding seam detection device. For example, the parameter of the welding seam detection device may include a detection range of the welding seam detection device, an accuracy of the welding seam detection device, or the like. The first parameters may be obtained through manual input.

In some embodiments, the first parameters may further include required detection time of the welding seam detection device In some embodiments of the present disclosure, the detection time determines retention time of the operating platform at each detection position, thereby ensuring that each portion of the welding seam is fully detected. If the operating platform moves to the next position before the detection is completed, some portions of the welding seam may not be fully detected.

The second parameter of the heat treatment device refers to a parameter related to the heat treatment device. For example, the parameter of the heat treatment device may include heating power of the heat treatment device, a temperature control parameter, or the like. The second parameters may be obtained through manual input.

In some embodiments, the second parameter may further include required processing time of the heat treatment device.

In some embodiments of the present disclosure, the heat treatment time also determines the retention time of the operating platform at each position on the annular track. By introducing the heat treatment time, it is ensured that the welding seam receives uniform and sufficient heating and insulation during the heat treatment process, thereby preventing incomplete heat treatment due to premature movement.

The circumferential rotation parameter refers to a parameter related to the circumferential movement of the operating platform 180 along the annular track 160.

In some embodiments, the circumferential rotation parameter may include a rotation period.

The rotation period refers to an interval at which the plurality of operating platforms 180 rotate along the annular track 160.

In some embodiments of the present disclosure, by introducing the rotation period, the detection device and the heat treatment device can coordinate with each other such that the processes of detection and heat treatment can seamlessly connect.

In some embodiments, the remote processor 510 may determine the circumferential rotation parameter in various ways. For example, the remote processor may compare the time required for welding seam detection and the time required for heat treatment, and determine a larger value of the time required for welding seam detection and the time required for heat treatment as the rotation period.

In some embodiments, the remote processor 510 may determine the circumferential rotation parameter based on the first parameter and the second parameter through a parameter determination model. The parameter determination model may be a machine learning model.

The parameter determination model refers to a model for predicting and determining the circumferential rotation parameter. In some embodiments, the parameter determination model may be the machine learning model, such as one of a temporal convolutional network (TCN), convolutional neural networks (CNN), or the like, or any combination thereof.

In some embodiments, an input of the parameter determination model may include the first parameter and the second parameter, and an output of the parameter determination model may include the circumferential rotation parameter.

The parameter determination model may be trained by using a plurality of fourth training samples with fourth labels. The fourth training samples may include a sample first parameter and a sample second parameter, and the fourth labels may include the circumferential rotation parameter corresponding to the sample data.

In some embodiments, the remote processor 510 may obtain the fourth training samples based on the sample data, and use the circumferential rotation parameter corresponding to the sample data as the fourth labels. The training process of the parameter determination model may be similar to that of the reliability value model. More descriptions regarding the training process of the parameter determination model may be found in the training process of the reliability value model described above.

In some embodiments of the present disclosure, by determining the circumferential rotation parameter through the parameter determination model, the model can learn from a large amount of historical data and adaptively adjust the circumferential rotation parameter according to different parameters of the welding seam detection device and heat treatment device, thereby improving the detection accuracy of the welding seam and the quality of heat treatment.

In some embodiments, the input of the parameter determination model may further include a perimeter of the annular track 160.

In some embodiments, the perimeter of the annular track 160 may be obtained based on user input data.

In some embodiments, the fourth training samples may further include a sample perimeter of the annular track 160. The sample perimeter of the annular track 160 may be obtained based on the sample data.

In some embodiments of the present disclosure, the perimeter of the annular track determines the total length of the entire track, which in turn affects the specific movement distance of the operating platform. By incorporating the perimeter information, the parameter determination model can more accurately determine the circumferential rotation parameter required for the operating platform in each rotation.

In some embodiments, the input of the parameter determination model may further include a cross-sectional diameter. The fourth training samples may further include a sample cross-sectional diameter. The sample cross-sectional diameter may be obtained based on sample data.

In some embodiments of the present disclosure, the cross-sectional diameter of the welded workpiece is capable of reflecting specific information about a detection target. By incorporating the cross-sectional diameter of the welded workpiece, the parameter determination model can adjust a movement parameter of each operating platform to ensure that the detection device and heat treatment device can effectively adapt to the size and shape of the welded workpiece.

In some embodiments of the present disclosure, by determining the circumferential rotation parameter, the smooth connection of the entire operation can be ensured. For example, if the time required by the welding seam detection device is longer and the time required by the heat treatment device is shorter, the circumferential rotation parameter takes the time required by the welding seam detection device to ensure that the detection can be fully completed without interruption caused by premature movement of the operating platform.

In some embodiments of the present disclosure, by alternately placing the welding seam detection device and heat treatment device on the plurality of operating platforms, the processes of detection and heat treatment can seamlessly connect with each other, thereby avoiding waiting time caused by manual switching between different devices. The seamless connection can greatly improve the operation efficiency and reduce pause and delay in the operation.

FIG. 5 is a block diagram illustrating an exemplary robot welding assembly system according to some embodiments of the present disclosure.

Some embodiments of the present disclosure further provide a robot welding assembly system. As shown in FIG. 5, a robot welding assembly system 500 may include the robot welding assembly mechanism 100 and the remote processor 510. The robot welding assembly mechanism 100 may include a rotatable column. The column may be mounted on a rotation base. A plurality of transverse clamping portions may be disposed at intervals on the column. The plurality of transverse clamping portions may be configured to clamp an end portion of a welded workpiece. A first V-shaped support portion may be disposed at a periphery of the column, the first V-shaped support portion being height-adjustable. The first V-shaped support portion may be mounted on a radial track. The first V-shaped support portion is capable of moving along the radial track to be fixed at an appropriate position. An extension line of the radial track may be perpendicular to and intersect with an axis of the column. The first V-shaped support portion may be located on an outer side of a center of gravity of the welded workpiece. An annular track may be disposed on an outer side of the radial track. The annular track may be coaxial with the column. A plurality of second V-shaped support portions may be disposed on the annular track, the plurality of second V-shaped support portions being height-adjustable. The plurality of second V-shaped support portions are capable of moving to a position to be fixed along the annular track. Both the first V-shaped support portion and the plurality of second V-shaped support portions are capable of supporting a non-welded portion of the welded workpiece to make an annular welding seam of the welded workpiece be suspended constantly. A first driving mechanism of the rotation base, a second driving mechanism of the plurality of transverse clamping portions, and a third driving mechanism of each of the plurality of second V-shaped support portions may be connected with a control system 520. A movable operating platform may be provided in the vicinity of the annular welding seam of the welded workpiece. The operating platform may be configured to place a welding seam detection device and a heat treatment device. The robot welding assembly mechanism 100 may be configured to perform an annular welding seam detection process and/or a postweld heat treatment process. The annular welding seam of the welded workpiece may include one or more pipe sections, first butt welding seams between the one or more pipe sections, and second butt welding seams between the one or more pipe sections and one or more pipe fittings. A nominal diameter of the annular welding seam may not be less than DN150 mm.

In some embodiments, the remote processor 510 may be configured to: obtain a height of the first V-shaped support portion and a cross-sectional diameter of the welded workpiece; obtain a welded workpiece image from an image acquisition device; determine an edge distance based on the welded workpiece image; and determine a movement distance of the operating platform based on the edge distance, the height, the cross-sectional diameter, and a current position of the operating platform. More descriptions regarding the functions of the remote processor 510 may be found in the present disclosure above. More descriptions regarding the robot welding assembly mechanism 100 being configured to perform the annular welding seam detection process and/or the postweld heat treatment process may be found in the present disclosure above.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or features may be combined as suitable in one or more embodiments of the present disclosure.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A robot welding assembly mechanism for annular weld detection and postweld heat treatment, wherein
the robot welding assembly mechanism includes a column, the column is mounted on a rotation base and rotates around an axis of the column; wherein
a plurality of transverse clamping portions are disposed at intervals on the column, the plurality of transverse clamping portions are configured to clamp an end portion of a welded workpiece;
a first V-shaped support portion is disposed at a periphery of the column, the first V-shaped support portion being height-adjustable, the first V-shaped support portion is mounted on a radial track, the first V-shaped support portion is capable of moving along the radial track to be fixed at an appropriate position, an extension line of the radial track is perpendicular to and intersects with the axis of the column, and the first V-shaped support portion is located on a side of the welded workpiece away from the column;
an annular track is disposed on an outer side of the radial track, the annular track is coaxial with the column, a plurality of second V-shaped support portions are disposed on the annular track, the plurality of second V-shaped support portions being height-adjustable, the plurality of second V-shaped support portions are capable of moving to a position to be fixed along the annular track, and both the first V-shaped support portion and the plurality of second V-shaped support portions are capable of supporting a non-welded portion of the welded workpiece to make an annular weld of the welded workpiece be suspended constantly;
a first driving mechanism of the rotation base, a second driving mechanism of the plurality of transverse clamping portions, and a third driving mechanism of each of the plurality of second V-shaped support portions are connected with a control system;
a movable operating platform is provided in the vicinity of the annular weld of the welded workpiece, the operating platform is configured to place a welding seam detection device and a heat treatment device, the robot welding assembly mechanism is configured to perform an annular weld detection process and/or a postweld heat treatment process; wherein the operating platform includes a movable part;
the annular weld of the welded workpiece includes one or more pipe sections, first butt welding seams between the one or more pipe sections, and second butt welding seams between the one or more pipe sections and one or more pipe fittings, a nominal diameter of the annular weld being not less than DN150 mm;
the robot welding assembly mechanism is configured to perform the annular weld detection process, including the following operations:
A. placing the welding seam detection device on the operating platform during a detection time period of the annular weld;
B. controlling the first driving mechanism of the rotation base and the third driving mechanism of each of the plurality of second V-shaped support portions, thereby making the column and the plurality of second V-shaped support portions synchronously rotate in place and then stop, at the same time, the annular weld of the welded workpiece being located right above or to a side of the welding seam detection device;
C. attaching patches to or marking detection portions on the annular weld;
D. turning on the welding seam detection device to carry out detection on a first detection region of the annular weld; after the detection of the first detection region is completed, turning off the welding seam detection device and controlling the second driving mechanism of the plurality of transverse clamping portions, thereby making the annular weld rotate by a preset angle, and then turning on the welding seam detection device to carry out detection on a second detection region of the annular weld until detection of all detection regions of the annular weld is completed;
E. referring to the operations B-D, carrying out detection on an annular weld of a next welded workpiece;
the robot welding assembly mechanism is configured to perform the postweld heat treatment process of the annular weld, including the following operations:
O. before a heat treatment of the annular weld, placing the heat treatment device on the operating platform;
P. controlling the first driving mechanism of the rotation base and the third driving mechanism of each of the plurality of second V-shaped support portions, thereby making the column and the plurality of second V-shaped support portions synchronously rotate in place and then stop, at this time, the annular weld of the welded workpiece being located in the vicinity of the heat treatment device;
Q. coating one or more adjacent annular welds with a heat treatment electrode and a heat insulation material;
R. turning on the heat treatment device to perform the heat treatment on the annular weld; and
S. referring to the operations P-R, performing the heat treatment on annular welds of other welded workpieces.

* * * * *